US012619539B2

(12) United States Patent
Zhao et al.

(10) Patent No.: US 12,619,539 B2
(45) Date of Patent: May 5, 2026

(54) TECHNIQUE FOR EFFICIENTLY OPERATING A DATA PROCESSING UNIT WHEN IN A DATA RETENTION MODE

(71) Applicant: Arm Limited, Cambridge (GB)

(72) Inventors: Yue Zhao, Chandler, AZ (US); Rong Zhang, Chandler, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/904,293

(22) Filed: Oct. 2, 2024

(65) Prior Publication Data

US 2026/0093630 A1  Apr. 2, 2026

(51) Int. Cl.
*G06F 12/0815* (2016.01)
*G06F 1/3287* (2019.01)
*G06F 12/084* (2016.01)

(52) U.S. Cl.
CPC ........ *G06F 12/0815* (2013.01); *G06F 1/3287* (2013.01); *G06F 12/084* (2013.01)

(58) Field of Classification Search
None
See application file for complete search history.

(56) References Cited

U.S. PATENT DOCUMENTS 5,530,932 A * 6/1996 Carmean ............... G06F 1/3203
711/146

11,289,133 B2 * 3/2022 Waugh ................ G11C 16/225
2010/0185821 A1 * 7/2010 Paver .................. G06F 12/0831
711/146
2010/0235670 A1 * 9/2010 Keller ................... G06F 1/3237
713/324

(Continued)

*Primary Examiner* — Kaushikkumar M Patel
(74) *Attorney, Agent, or Firm* — NIXON & VANDERHYE P.C.

(57)  ABSTRACT

A processing unit has processing circuitry for performing data processing operations on data accessible in memory, and cache storage to store a subset of the data accessible in the memory, for access by the processing circuitry. Memory control circuitry controls access to a given portion of the memory associated with the processing unit, the given portion of memory comprising at least a shareable memory region to store data that is also accessible by at least one external processing element. Snoop circuitry, responsive to a snoop request identifying a memory address, performs a coherency action in respect of data stored in the cache storage for the identified memory address. Power control circuitry enables the processing unit to be transitioned between a plurality of operating modes, including a data retention mode where the data in the cache storage is retained whilst the processing circuitry and the snoop circuitry are inactive. When transitioning the processing unit into the data retention mode, a given invalidation coherency action is performed in order to invalidate each cache entry storing data associated with a memory address in the shareable memory region. Whilst the processing unit is in the data retention mode, the memory control circuitry allows a write operation instigated by the at least one external processing element, that specifies a given memory address within the shareable memory region, to be performed without waking up the snoop circuitry to process a corresponding snoop request for the given memory address.

19 Claims, 9 Drawing Sheets

(56) References Cited

U.S. PATENT DOCUMENTS

| | | | |
|---|---|---|---|
| 2013/0117511 A1* | 5/2013 | Brown | G06F 12/0831 |
| | | | 711/141 |
| 2014/0095801 A1* | 4/2014 | Bodas | G06F 1/3225 |
| | | | 711/135 |
| 2015/0268711 A1* | 9/2015 | Ramani | G06F 12/0804 |
| | | | 713/320 |
| 2016/0154735 A1* | 6/2016 | Hwang | G06F 12/0895 |
| | | | 711/130 |
| 2019/0187770 A1* | 6/2019 | Severino | G06F 1/3234 |

* cited by examiner

GLOBAL INVALIDATION
COHERENCY ACTION

SNOOP REQUEST
HANDLING

SNOOP
REQUEST RECEIVED
IDENTIFYING GIVEN
MEMORY ADDRESS
? — 500

N

Y

PERFORM LOOKUP IN TAG RAM
AS SNOOP FILTER TO DETERMINE
IF DATA FOR GIVEN MEMORY
ADDRESS IS CACHED — 505

DATA FOR
GIVEN MEMORY
ADDRESS IS
CACHED
? — 510

N → NO
ACTION — 515

Y

MARK RELEVANT
CACHE ENTRY AS
INVALID — 520

TECHNIQUE FOR EFFICIENTLY OPERATING A DATA PROCESSING UNIT WHEN IN A DATA RETENTION MODE

BACKGROUND

The present technique relates to the field of data processing, and more particularly to techniques for efficiently operating a data processing unit when in a data retention mode.

In order to seek to improve energy efficiency/reduce power consumption, a modern data processing unit is often able to be transitioned between a number of different operating modes. For example, in addition to a normal mode of operation where the processing unit's circuits are active and able to perform data processing operations, one or more lower power modes of operation may be supported to seek to reduce power consumption. For instance, a data retention mode may be supported that is used to retain the data held in certain data structures of the processing unit, whilst various of the circuits within the processing unit are placed into an inactive state in order to reduce power consumption. This can be useful, for example, during periods of time where the processing unit does not have active tasks to perform, but where it is expected that when such tasks resume the processing unit will require access to the data held in the data structures.

One such data structure in which it may be desired to retain data during the data retention mode is a data cache used to store a subset of the data accessible in memory, for access by processing circuitry of the processing unit. One or more regions of memory may be shareable memory regions used to store data that is accessible not only by the processing unit, but also by at least one processing element external to the processing unit (such data being referred to herein as shareable data). For such shareable data it is known to provide a coherency mechanism to seek to ensure that each entity that can access the shareable data will see a coherent view of that data. However, in situations where the processing unit may cache shareable data in its data cache, this can cause issues when seeking to maintain coherency of that data when the processing unit is in the data retention mode. In particular, when an external processing element seeks to update an item of shareable data, then in order to implement coherency it may be required to cause the processing unit to exit the data retention mode in order to allow a lookup to be performed within the data cache to determine whether the processing unit has a cached copy of the data in question. This can significantly impact the power consumption benefits that might otherwise be achieved by using the data retention mode.

SUMMARY

In accordance with a first example arrangement, there is provided a processing unit comprising: processing circuitry configured to perform data processing operations on data accessible in memory; cache storage having a plurality of cache entries configured to store a subset of the data accessible in the memory, for access by the processing circuitry; memory control circuitry configured to control access to a given portion of the memory associated with the processing unit, the given portion of memory comprising at least a shareable memory region to store data that is also accessible by at least one external processing element external to the processing unit; snoop circuitry, responsive to a snoop request identifying a memory address, to perform a coherency action in respect of data stored in the cache storage for the identified memory address; and power control circuitry configured to enable the processing unit to be transitioned between a plurality of operating modes, including a data retention mode where the data in the cache storage is retained whilst the processing circuitry and the snoop circuitry are configured to be inactive; wherein: the power control circuitry is configured, when transitioning the processing unit into the data retention mode, to cause a given invalidation coherency action to be performed in order to invalidate each cache entry storing data associated with a memory address in the shareable memory region; and the memory control circuitry is configured, whilst the processing unit is in the data retention mode, to allow a write operation instigated by the at least one external processing element, that specifies a given memory address within the shareable memory region, to be performed without waking up the snoop circuitry to process a corresponding snoop request for the given memory address.

In accordance with another example arrangement, there is provided a method of operating a processing unit, comprising: performing, using processing circuitry, data processing operations on data accessible in memory; storing, within a cache storage having a plurality of cache entries, a subset of the data accessible in the memory, for access by the processing circuitry; controlling, using memory control circuitry, access to a given portion of the memory associated with the processing unit, the given portion of memory comprising at least a shareable memory region to store data that is also accessible by at least one external processing element external to the processing unit; responsive to a snoop request identifying a memory address, performing using snoop circuitry a coherency action in respect of data stored in the cache storage for the identified memory address; transitioning the processing unit between a plurality of operating modes, including a data retention mode where the data in the cache storage is retained whilst the processing circuitry and the snoop circuitry are configured to be inactive; when transitioning the processing unit into the data retention mode, causing a given invalidation coherency action to be performed in order to invalidate each cache entry storing data associated with a memory address in the shareable memory region; and whilst the processing unit is in the data retention mode, allowing a write operation instigated by the at least one external processing element, that specifies a given memory address within the shareable memory region, to be performed without waking up the snoop circuitry to process a corresponding snoop request for the given memory address.

In accordance with a still further example arrangement, there is provided a system comprising: a processing unit in accordance with the first example arrangement discussed above, implemented in at least one packaged chip; at least one system component; and a board, wherein the at least one packaged chip and the at least one system component are assembled on the board. In an additional example arrangement, the above-mentioned system may be assembled on a further board with at least one other product component.

In a yet further example arrangement, there is provided a computer-readable medium storing computer-readable code for fabrication of a processing unit in accordance with the first example arrangement discussed above. The computer-readable medium may be a transitory computer-readable medium (such as wired or wireless transmission of code over a network) or a non-transitory computer-readable medium such as semiconductor, magnetic disk, or optical disc.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
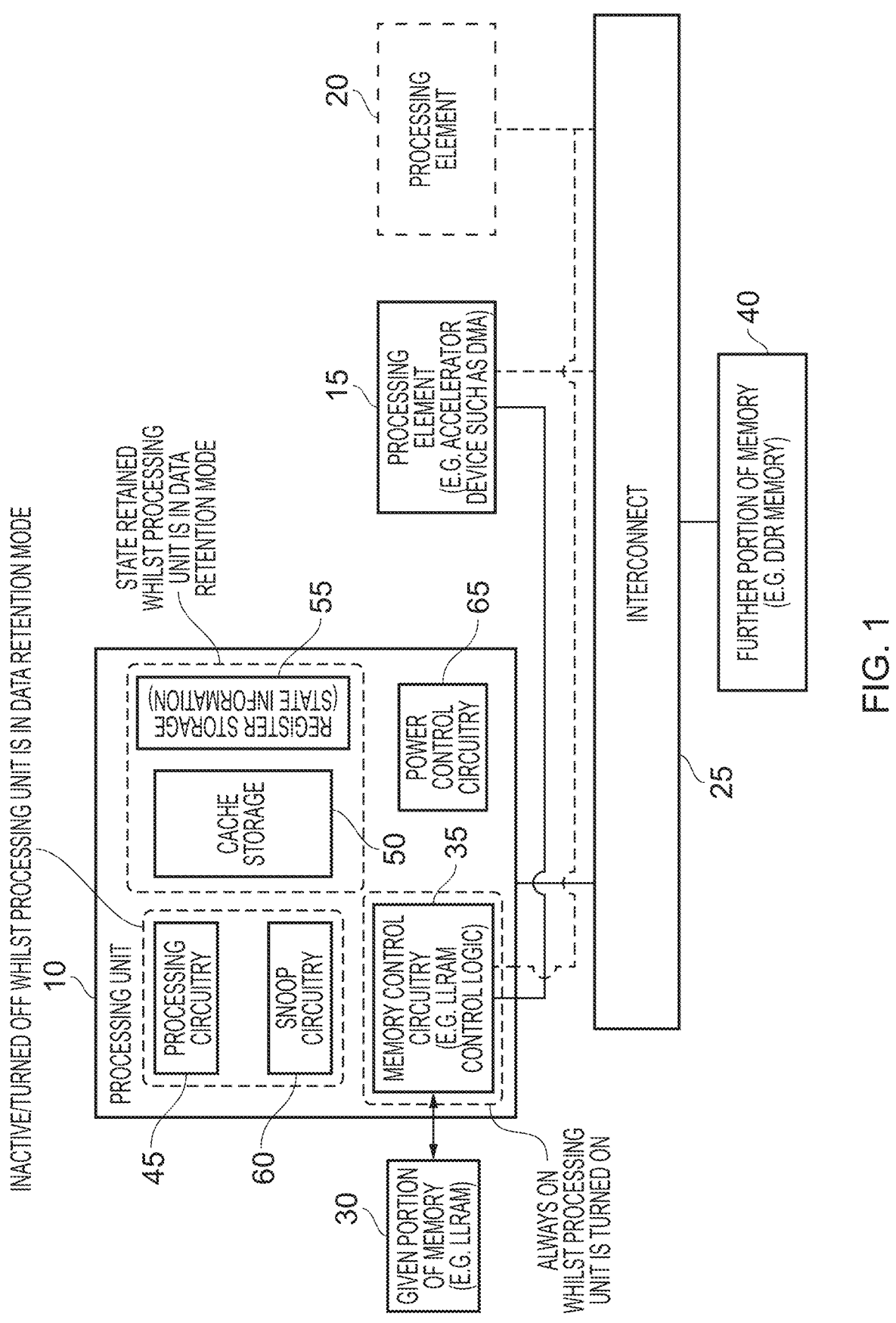
FIG. 1 is a block diagram schematically illustrating a data processing system in which the techniques described herein may be employed, in accordance with one example implementation.

In accordance with one example implementation, a processing unit is provided that has processing circuitry configured to perform data processing operations on data accessible in memory, and a cache storage having a plurality of cache entries configured to store a subset of the data accessible in the memory, for access by the processing circuitry. In addition, memory control circuitry is provided that is configured to control access to a given portion of the memory associated with the processing unit. The given portion of memory comprises at least a shareable memory region to store data that is also accessible by at least one external processing element external to the processing unit. The shareable memory region can take a variety of forms, and may not necessarily be a contiguous series of memory addresses.

Instead, any combination of memory addresses may form the shareable memory region. Further, whilst in some implementations the addresses forming the shareable memory region may be static, in another example implementation those addresses could be dynamically allocated into and out of the shareable memory region during operation of the processing unit.

The above-mentioned given portion of the memory will typically be part of the overall memory of the system in which the processing unit resides, but is arranged to be associated with the processing unit to allow ready access to that portion of the memory by the processing unit. In particular, access to the given portion of the memory is controlled by memory control circuitry of the processing unit. Whilst there may be various reasons for providing such a portion of memory associated with the processing unit, in one example implementation this is done to provide a portion of memory that the processing unit can access relatively quickly when compared with other portions of the memory. For instance, in one example implementation, the memory may also comprise a further portion that is accessible to the processing unit via interconnect circuitry, with the above-mentioned given portion of the memory being configured to provide the processing unit with lower latency access to data than when accessing data in the further portion. The reduction in latency can be due to a variety of factors, for example the memory technologies used to implement the given portion and the further portion (a low latency RAM technology may in one example implementation be used to implement the given portion), the relative sizes of the memory portions (the given portion may in some implementations be relatively small compared to the further portion and thus generally quicker to access), differences in the routing path between the processing unit and the given portion of memory, and between the processing unit and the further portion of memory (the given portion may be located relatively close to the processing unit and/or accessible via a faster communication path than that available when accessing the further portion of memory), etc.

As noted above, whilst the given portion of memory is associated with the processing unit, it does have a shareable memory region that can be used to store shareable data accessible by at least one external processing element. Hence, such an external processing element can access such shareable data within the given portion of memory via the earlier-mentioned memory control circuitry of the processing unit. Assuming the external processing element has write access to such data, this also means that the external processing element could seek to update such shareable data.

As also noted earlier, the processing unit has cache storage in which it can store a subset of the data accessible in memory, including copies of the earlier-mentioned shareable data. In order to ensure data coherency, then in one example implementation, the processing unit has snoop circuitry, responsive to a snoop request identifying a memory address, to perform a coherency action in respect of data stored in the cache storage for the identified memory address. Hence, by way of example, if the memory control circuitry detects that an external processing element is seeking to access data that may be cached within the processing unit's cache, it can issue a snoop request to cause the snoop circuitry to check if a copy of the data in question is indeed cached within the cache storage, and in that event to perform a suitable coherency action.

Data that is identified as cacheable can have a variety of cache attributes to identify how that data should be treated when stored in the cache. Such cache attributes can be stored for example within registers of a memory protection unit (MPU) of the processing unit used to control access to memory addresses, and can be configured by software having an appropriate level of privilege. For example, for certain memory addresses, or ranges of memory addresses, whose associated data is cacheable, a cache attribute may identify that that data is to be treated as write through data or write back data. If data is treated as write through data, this means that any update made to that data whilst stored in the cache is also propagated through to memory so as to keep the data as stored in memory consistent with the cached copy of that data. Conversely, if data is treated as write back data, this means that it can be updated within the cache (and flagged at that point as being dirty data) without the update being propagated to memory at that time. The earlier-mentioned coherency action that may be taken by the snoop circuitry will depend on whether the item of data in question is write through or write back, as well as the coherency mechanism employed. In one example implementation, an invalidation coherency mechanism is employed, and hence if for a given memory address identified by a snoop request, a copy of the data for that memory address is held within the cache, it can merely be invalidated if that data is write through data. If instead the data is write back data, then a clean and invalidate operation can be performed in order to ensure that the copy of the data in memory is updated, and the cached copy is invalidated.

In one particular example implementation discussed herein, any shareable data in the above-mentioned given portion of memory that can be cached is treated as write through data, and hence when such data is the subject of a snoop request, all that is required if the snoop circuitry detects that the data in question is cached is for that cached copy of the data to be invalidated. This hence enables snoops performed in relation to shareable data associated with a memory address in the given portion of memory to be performed quickly.

As discussed earlier, in order to seek to improve energy efficiency/reduce power consumption, a modern data processing unit may be able to be transitioned between a number of different operating modes. In accordance with the techniques described herein, the processing unit has power control circuitry configured to enable the processing unit to be transitioned between a plurality of operating modes, including a data retention mode where the data in the cache storage is retained whilst the processing circuitry and the snoop circuitry are configured to be inactive. One issue that can arise whilst the processing unit is in the data retention mode is how to deal with a write request issued by an external processing element relating to shareable data held within the given portion of memory. In particular, such data may be cached within the cache storage of the processing unit, and hence to ensure coherency it would typically be necessary to cause the snoop circuitry to perform a snoop operation in order to check whether a copy of the data has indeed been cached, and in that event to perform a coherency action (as noted above in one example implementation this would involve invalidating the cached copy of the data). However, in order to achieve this, it would be necessary to exit the data retention mode, in order to activate the snoop circuitry and allow it to process such a snoop request. It should be noted this would be necessary irrespective of whether in fact a copy of the relevant data has been cached since that is only determined once the snoop is performed. It has been found that this can significantly impact the performance benefits that could otherwise be achieved by using the data retention mode. For example, the external processing element may be an accelerator device such as a direct memory access (DMA) unit, and such a DMA unit may be used to perform a variety of memory access operations for the processing unit, including whilst the processing unit is in the above-mentioned data retention mode. Such activity could cause the processing unit to have to exit the data retention mode multiple times in order to service snoop requests.

In accordance with the techniques described herein, this problem is alleviated by taking an additional step before the data retention mode is entered. In particular, in accordance with the techniques described herein, the power control circuitry is configured, when transitioning the processing unit into the data retention mode, to cause a given invalidation coherency action to be performed in order to invalidate each cache entry storing data associated with a memory address in the shareable memory region. The given invalidation coherency action could be triggered, for example, by the power control circuitry issuing a signal to the snoop circuitry to cause the snoop circuitry to implement that invalidation coherency action. Given that this step is taken prior to entering the data retention mode, the memory control circuitry may be configured, whilst the processing unit is in the data retention mode, to allow a write operation instigated by the at least one external processing element, that specifies a given memory address within the shareable memory region, to be performed without waking up the snoop circuitry to process a corresponding snoop request for the given memory address.

This hence enables shareable data held in the given memory portion to be updated whilst the processing unit is in the data retention mode, without any need to perform associated coherency operations. It has been found that this can significantly reduce power consumption, by enabling the processing unit to stay in the data retention mode for longer periods of time, and/or with less interruption. It has also been found that it does not significantly impact the processing unit's performance when the processing unit subsequently re-enters the normal mode. In particular, the above invalidation step prior to entering the data retention mode only affects copies of shareable data from the given portion of memory, and not copies of data from other parts of the memory system. Further, since the given portion of memory is associated with the processing unit and typically arranged for low latency access, copies of any such shareable data can be readily retrieved by the processing unit if required.

In accordance with the techniques described herein, the memory control circuitry is in a power domain that will cause it to remain powered when the processing unit is in the data retention mode, hence enabling it to process access requests to the given portion of the memory from an external processing element whilst the processing unit is in the data retention mode. In one particular example implementation, the memory control circuitry is in a sub-system domain which is always on whilst that sub-system is receiving a power supply.

As noted earlier, the plurality of operating modes may further comprise a normal mode where the processing circuitry and the snoop circuitry are configured to be active. In one example implementation, the memory control circuitry is configured, whilst the processing unit is in the normal mode, to be responsive to a write operation instigated by the at least one external processing element that specifies a given memory address within the shareable memory region, to allow the write operation to be performed but in addition to cause a corresponding snoop request to be issued to the snoop circuitry to cause the coherency action to be performed in the event that data for the given memory address is stored within the cache storage. Hence, during normal operation, the processing unit's cache storage can be used to cache data from the shareable memory region of the given portion of memory, and snoop requests will be issued as usual to ensure that coherency of such data is maintained in the event that an update of that data is performed by an external processing element.

Whilst in one example implementation the entirety of the given portion of memory may be used to form the earlier-mentioned shareable memory region, and hence any data stored therein may be accessible to at least one external processing element, in other example implementations the given portion of memory may further comprise a non-shareable memory region to store data inaccessible to the at least one external processing element. Data associated with an address in the non-shareable memory region of the given portion of memory may also be cacheable, and in one example implementation both write through data and write back data can be supported within the non-shareable memory region. However, because such data is in a non-shareable memory region, only the processing unit should access that data, and accordingly in one example implementation no snoop should be required in respect of such data held in the cache storage, and no hardware coherency support is provided for such data.

As noted earlier, the power control circuitry may be configured, when transitioning the processing unit into the data retention mode, to cause a given invalidation coherency action to be performed in order to invalidate each cache entry storing data associated with a memory address in the shareable memory region. The form of the given invalidation coherency action may vary dependent on implementation. However, as noted earlier, in one particular example implementation the cache storage is configured to treat any cacheable data associated with a memory address in the shareable memory region as write through, and in such an implementation the given invalidation coherency action may merely comprise marking as invalid each cache entry storing data associated with a memory address in the shareable memory region.

In order to perform the given invalidation coherency action, it is necessary to assess the type of data held in each cache entry, so that for any given cache entry it can be determined whether that cache entry is currently storing valid data associated with the shareable memory region, and if so to cause that cache entry to be marked as invalid (such that if in due course an attempt is made to access that data again, a miss will be detected in the cache causing the data to be accessed instead in the given portion of memory). Typically, the required state information needed to make this assessment will be stored within the cache storage itself, for example as state information provided within one or more fields of a tag entry portion of a cache entry also used to provide address indicating information for identifying the memory address associated with the data stored in that cache entry. Hence, depending on the size of the cache storage, it can take a non-trivial amount of time to perform the above-mentioned given invalidation coherency action even though, for any given cache entry storing a copy of data in the shareable memory region, all that is required is to mark that cache entry as invalid.

However, in accordance with one example implementation, state information associated with the cache entries of the cache storage is organised in a way that can significantly reduce the time taken to perform the above-mentioned given invalidation coherency action. In particular, in one example implementation, the processing unit further comprises register storage associated with the cache storage, the register storage providing a plurality of register entries, wherein each register entry is arranged to store state information for an associated cache entry of the cache storage, and the state information is sufficient to enable identification of the cache entries that have stored therein data associated with a memory address in the shareable memory region. In such an implementation, the given invalidation coherency action can be performed by referencing the state information in the register storage without requiring a lookup in the cache storage to be performed. It can be significantly quicker to access the register storage than would be the case were the state information retained within the cache storage itself, and as a result a significant reduction in the time taken to perform the given invalidation coherency action can be achieved.

In one example implementation, performance of the given invalidation coherency action comprises identifying each register entry whose state information indicates that the associated cache entry has stored therein data associated with a memory address in the shareable memory region, and for each identified register entry updating the state information to indicate that the associated cache entry is in an invalid state. In one particular example implementation, all of the register entries can be accessed in parallel in order to identify the subset of those register entries whose state information indicates that the associated cache entry is storing shareable data from the shareable memory region, and then all of those identified register entries can have their state updated to indicate the corresponding cache entries as now being invalid.

As noted earlier, in one example implementation, the memory may comprise (in addition to the earlier-mentioned given portion) a further portion that is accessible to the processing unit via interconnect circuitry. That further portion may comprise a further shareable memory region to store data that is also accessible by the at least one external processing element, and a further non-shareable memory region to store data inaccessible to the at least one external processing element.

The earlier mentioned state information maintained within the register entries can take a variety of forms, but in one particular implementation each register entry may be arranged to identify, for the associated cache entry, one of the following states:

a first state indicating that the associated cache entry is invalid;

a second state indicating that the associated cache entry stores data that is clean and in a shareable memory region of the memory;

a third state indicating that the associated cache entry stores data that is clean and in a non-shareable memory region of the memory;

a fourth state indicating that the associated cache entry stores data that is dirty and in the non-shareable memory region of the memory.

In one example implementation where the memory also includes the earlier-mentioned further portion, the third state and the fourth state could be used in respect of cacheable data from both the non-shareable memory region of the given portion and the further non-shareable memory region of the further portion. In one example implementation data from both of those non-shareable memory regions may be either write back data or write through data, and hence the fourth state is used to identify any cache entries storing write back data that is now dirty.

In principle, the second state could be used in respect of cacheable data from both the shareable memory region of the given portion and the further shareable memory region of the further portion, assuming the processing unit was allowed to cache data from the shareable memory region of the further portion in its cache storage and a suitable coherency mechanism was implemented to manage coherency of that data. However, in one particular example implementation, in order to reduce complexity, the processing unit is arranged to treat any data stored in the further shareable memory region as non-cacheable so that the cache storage is arranged, when caching data from the further portion of the memory, to only cache data from the further non-shareable memory region. By adopting such an approach, there will then not be any need for snoop operations to be performed within the processing unit's cache storage in relation to data from the further portion of memory, since if an external processing element updates shareable data in that further portion of memory it is known that that data will not be cached within the processing unit's cache storage, and hence no snoop is required. Thus no mitigating measures need to be taken in respect of such shareable data prior to the processing unit entering the data retention mode (in contrast to the mitigating (invalidating) measures discussed earlier that are taken in respect of shareable data associated with a memory address in the shareable memory region of the given portion of memory).

If in an alternative implementation, instead of the processing unit downgrading any data stored in the further shareable memory region to be non-cacheable, the processing unit allowed such shareable data to be cached, then software may be required to manage the coherence of that data. Rather than incurring the complexity that would be associated with such an approach, the earlier-described mechanism of treating any such shareable data from the further memory region as non-cacheable can significantly reduce complexity and thus simplify the handling of transitions of the processing unit into and out of the data retention mode of operation.

Regarding any non-shareable data from the further non-shareable memory region that has been cached in the processing unit's cache storage, only the processing unit should access that data given its non-shareable attribute, and accordingly in one example implementation such data can remain cached whilst the processing unit is in the data retention mode since no snoop is required in respect of such data held in the cache storage, and no hardware coherency support is provided for such data.

When adopting an implementation where the processing unit is arranged to treat any data stored in the further shareable memory region as non-cacheable, then the earlier-mentioned second of the four states that the register entries can take indicates that the associated cache entry stores data that is clean and in the shareable memory region of the given portion of the memory, since the cache storage is not configured to cache data from the further shareable memory region. Hence, when performing the earlier-mentioned given invalidation coherency action, all that is required is to identify every register entry that is in the second state, and change each such identified register entry's state to indicate the first state, i.e. indicating that the associated cache entry is invalid.

The cache entries of the cache storage can be organised in a variety of ways. However, in one example implementation, each cache entry comprises a data entry for storing data and a TAG entry for storing address indicating information used to identify the memory address associated with that data. The snoop circuitry can then be arranged, when processing a snoop request identifying a given memory address, to reference at least a subset of the TAG entries to determine whether one of the cache entries stores data for the given memory address, and in that event to perform the coherency action. The actual TAG entries that need to be referenced when processing the snoop request may vary dependent on the arrangement of the cache. For instance, if the cache is arranged as a fully associative cache, each tag entry may need to be referenced. However, if the cache is arranged as a set associative cache, then an index portion of the given memory address can be used to identify a particular set within the cache, and only the cache entries of that set then need to be referenced.

As noted earlier, the coherency action required on identifying that a cache entry stores data for the given memory address specified by a snoop request may vary dependent on the cache attributes of the data in question, and the coherency mechanism employed. However, in one example implementation, the coherency action comprises invalidating the identified cache entry when the data for the given memory address is being treated as write through. As noted earlier, a clean and invalidate operation may be required if the data of the identified cache entry is being treated as write back data. However, in one particular example implementation, any shareable data from the given portion of memory is treated as write through data, and any shareable data from the further portion of memory is downgraded to be non-cacheable, and accordingly in that particular example implementation there will be no need to support a clean and invalidate coherency operation since any cache entry identified when processing a snoop request will contain write through data, and accordingly can merely be invalidated.

The at least one external processing element that is allowed to access data in the shareable memory region of the given portion of memory can take a variety of forms, but in one example implementation comprises at least an accelerator device configured to perform tasks on behalf of the processing unit. As a particular example of such an accelerator device, a DMA engine may be used to perform certain tasks on behalf of the processing unit, and indeed may perform those tasks whilst the processing unit is in the earlier-mentioned data retention mode. Hence, it can be very useful to take the cache entry invalidation measures discussed earlier prior to entering the data retention mode, to avoid the need for the processing unit to exit data retention mode to perform snoop requests triggered by data updates made by the DMA engine.

Particular examples will now be described with reference to the figures.

FIG. 1 is a block diagram schematically illustrating a data processing system in which the techniques described herein may be employed, in accordance with one example implementation. A processing unit 10 is provided, that has processing circuitry 45 for performing data processing operations on data accessible in memory 30, 40. The memory includes a given portion 30 that is associated with the processing unit 10, and accessible via memory control circuitry 35 of the processing unit 10. This given portion 30 of memory can take a variety of forms, but in one example implementation is implemented as low latency random access memory (LLRAM). In the example implementation shown, a further portion of memory 40 is provided that is accessible to the processing unit 10 via an interconnect 25. In one particular example implementation this is implemented as double data rate (DDR) memory. By providing the given portion 30 of memory in association with the processing unit, this can provide the processing unit with a lower latency access to data stored therein than is possible when accessing data in the further portion of memory 40 via the interconnect 25, which can provide significant performance benefits.

In one example implementation, the LLRAM memory 30 has a shareable memory region that can be used to store shareable data accessible by at least one external processing element 15, 20, external to the processing unit 10. In the example shown in FIG. 1, it is assumed that the processing element 15, which in one example implementation may take the form of an accelerator device such as a DMA engine, has access to such shareable data in the LLRAM 30 and is arranged to access the LLRAM via the memory control circuitry 35 of the processing unit 10, this memory control circuitry also being referred to herein as LLRAM control logic. It should be noted that the LLRAM may also include a non-shareable memory region used to store data that is inaccessible by a processing element external to the processing unit 10.

The processing unit 10 has cache storage 50 providing a plurality of cache entries that are configured to store a subset of the data accessible in memory. Indeed, the processing unit 10 may have a data cache for storing data values, and a separate instruction cache for storing instructions retrieved from memory. However, the instruction cache operates in the standard manner and is unaffected by the cache entry invalidation procedures described herein. Hence, for the purposes of the following discussion the cache storage 50 can be assumed to be a data cache storing data values accessible to the processing circuitry 45 when performing data processing operations, and the instruction cache is omitted from FIG. 1.

In order to ensure data coherency, the processing unit 10 has snoop circuitry 60 arranged to be responsive to a snoop request identifying a memory address, to perform a coherency action in respect of data stored in the cache storage for that identified memory address. Hence, by way of example, if the LLRAM control logic 35 detects that the DMA engine 15 is seeking to access data in the LLRAM 30 that may be cached within the cache 50 of the processing unit 10, it can issue a snoop request to cause the snoop circuitry 60 to check if a copy of the data in question is indeed cached within the cache 50, and in that event to perform a suitable coherency action. The issuance of such a snoop request may hence be required if the DMA engine seeks to access data in the shareable memory region of the LLRAM. Whilst the coherency action required if a cached copy of data for the memory address identified by the snoop request is detected can take a variety of forms, in one example implementation cacheable data associated with the shareable memory region of the LLRAM 30 will have an associated cache attribute to identify that that data is to be treated as write through data (rather than write back data), and hence when a copy of such data is found within the cache during processing of a snoop request, the required coherency action will merely involve invalidating the cache entry storing that data.

Regarding the non-shareable memory region of the LLRAM, the DMA engine (or indeed any external processing element) should not be seeking to access data in the non-shareable memory region since that is data solely accessible to the processing unit 10, and hence whilst such data could be cached within the data cache 50, no snoop request should be raised in respect of such data, and hence in one example implementation no hardware coherency mechanism is implemented in respect of the non-shareable memory region.

In order to seek to improve energy efficiency/reduce power consumption, the data processing unit is able to be transitioned between a number of different operating modes, under control of the power control circuitry 65. In accordance with the techniques described herein, the plurality of mode includes a normal mode of operation where the processing unit's circuits are active and able to perform data processing operations, and one or more lower power modes of operation that are employed to seek to reduce power consumption. One low-power mode supported is referred to herein as a data retention mode where the data in the cache storage 50 is retained whilst the processing circuitry 45 and the snoop circuitry 60 are configured to be inactive (for example by being turned off). One issue that can arise whilst the processing unit 10 is in the data retention mode is how to deal with a write request issued by an external processing element such as the DMA engine 15 relating to shareable data held within the LLRAM 30. In particular, such data may be cached within the cache storage 50, and hence to ensure coherency it would typically be necessary to cause the snoop circuitry 60 to perform a snoop operation in order to check whether a copy of the data has indeed been cached, and in that event to perform a coherency action (as noted above in one example implementation this would involve invalidating the cached copy of the data). However, in order to achieve this, it would be necessary to exit the data retention mode, in order to activate the snoop circuitry 60 and allow it to process such a snoop request. It has been found that this can significantly impact the performance benefits that could otherwise be achieved by using the data retention mode.

In accordance with the techniques described herein, this problem is alleviated by taking an additional step before the data retention mode is entered. In particular, the power control circuitry 65 is configured, when transitioning the processing unit into the data retention mode, to trigger the snoop circuitry 60 to invalidate each cache entry storing data associated with a memory address in the shareable memory region of the LLRAM 30. Given that this step is taken prior to entering the data retention mode, the LLRAM control logic 35 can then be arranged, whilst the processing unit 10 is in the data retention mode, to allow a write operation instigated by an external processing element such as the DMA engine 15, that specifies a memory address within the shareable memory region, to be performed without waking up the snoop circuitry 60 to process a corresponding snoop request for the specified memory address.

This hence enables shareable data held in the LLRAM to be updated whilst the processing unit is in the data retention mode, without any need to perform associated coherency operations. It has been found that this can significantly reduce power consumption, by enabling the processing unit 10 to stay in the data retention mode for longer periods of time, and/or with less interruption. It has also been found that it does not significantly impact the processing unit's performance when the processing unit subsequently re-enters the normal mode. In particular, the above invalidation step prior to entering the data retention mode only affects copies of shareable data held within the LLRAM, and not copies of data held in other parts of the memory system. Further, since the LLRAM is provided for low latency access by the processing unit, copies of any such shareable data can be readily retrieved by the processing unit if required.

In one example implementation, the DMA engine 15 is arranged to only perform tasks on behalf of the processing unit 10 in respect of shareable data stored within the LLRAM 30 and hence may have no separate connection to the interconnect 25 since it has no need to access the further portion of memory 40. However, in an alternative implementation, the DMA engine 15 may also have a connection to the interconnect 25 to enable it to perform memory access tasks on behalf of the processing unit in respect of shareable data held within the further portion of memory 40. Whilst the interconnect 25 could be arranged as a coherent interconnect with a cache coherency mechanism incorporated at the interconnect level to manage coherency of data accessed in the further portion of memory 40, in one particular example implementation the data processing system illustrated in FIG. 1 is arranged to be a low-cost, low complexity system and no hardware coherency mechanism is supported at the interconnect level (the interconnect 25 hence being a non-coherent interconnect). To avoid the need for software to manage coherency of any shareable data in the further portion memory 40, in one example implementation the processing unit 10 is arranged to treat any shareable data accessed in the further portion memory 40 as non-cacheable, and hence such data will not be cached within the cache storage 50 and will always be accessed by the processing unit 10 directly from the memory 40.

In one particular example implementation, the system only has a single processing unit 10 and an associated DMA engine 15, with the DMA engine not having any local cache storage. However, as shown in FIG. 1, if desired one or more additional processing elements 20 may be provided within the system and any such additional processing element may be coupled to the LLRAM control logic 35 if it has access to shareable data in the LLRAM 30, and/or may be coupled to the interconnect 25 to enable it to access the further portion of memory 40. Any such additional processing element 20, if it provides internal cache storage, may be arranged in a similar way to the processing unit 10, and include local snoop circuitry to perform lookups in its associated local cache in order to implement required coherency actions in respect of shareable data that is cached. For instance, the processing element 20 may also have access to shareable data within the LLRAM 30 and may be able to cache copies of that data in its own local cache. In such an event, snoop requests may be propagated between the processing unit 10 and the processing element 20 when either the processing unit 10 or the processing element 20 is accessing such shareable data, to ensure that any local copy is invalidated before the data is updated. Similarly, when the DMA engine 15 is seeking to update such shareable data, snoop requests may be issued to both the snoop circuitry 60 of the processing unit 10 and corresponding snoop circuitry within the processing element 20. In the example implementation shown, it is assumed that the DMA engine does not have any internal cache, and hence does not itself need to be snooped when updates are performed to data in the shareable memory region of the LLRAM. As noted earlier, no hardware coherency mechanism is provided in relation to the further portion of memory 40 in one example implementation, and the processing element 20, just like the processing unit 10, can be arranged to treat any shareable data accessed in the further portion of memory 40 as non-cacheable to thereby avoid the need to provide any software coherency management in respect of such data.

As mentioned earlier, in accordance with the techniques described herein, the power control circuitry 65 is configured, when transitioning the processing unit into the data retention mode, to trigger the snoop circuitry 60 to invalidate each cache entry storing data associated with a memory address in the shareable memory region of the LLRAM 30. In order to do this, it would typically be necessary to assess the type of data held in each cache entry, so that for any given cache entry it can be determined whether that cache entry is currently storing valid data associated with the shareable memory region, and if so to cause that cache entry to be marked as invalid. Normally the state information that would need to be considered in order to make the above determination may be held within the cache entries themselves, for example as state information within one or more fields of a tag entry portion of a cache entry. However, in accordance with one example implementation described herein, register storage 55 is provided in association with the cache storage 50 in order to maintain such state information externally to the cache storage itself. By storing such information in registers, this significantly decreases the time taken to assess the required state information when performing the above invalidation actions, by avoiding the need to access the cache storage itself. In one particular example implementation, the registers can be accessed in parallel to enable the state information for all of the cache entries to be determined within a single clock cycle. Indeed, in one particular example implementation, any necessary updates of that state information to invalidate the relevant cache entries can also be achieved within the single clock cycle.

As shown in FIG. 1, both the cache storage 50 and the associated register storage 55 retain their state whilst the processing unit 10 is in the data retention mode, whilst processing circuitry 45 and snoop circuitry 60 are inactive/turned off whilst the processing unit is in the data retention mode. As also shown in FIG. 1, the LLRAM control logic 35 is retained within a power domain that causes that LLRAM control logic to remain powered whilst the processing unit is in the data retention mode, and in one particular example implementation is located within an always on power domain.

Figure 2:
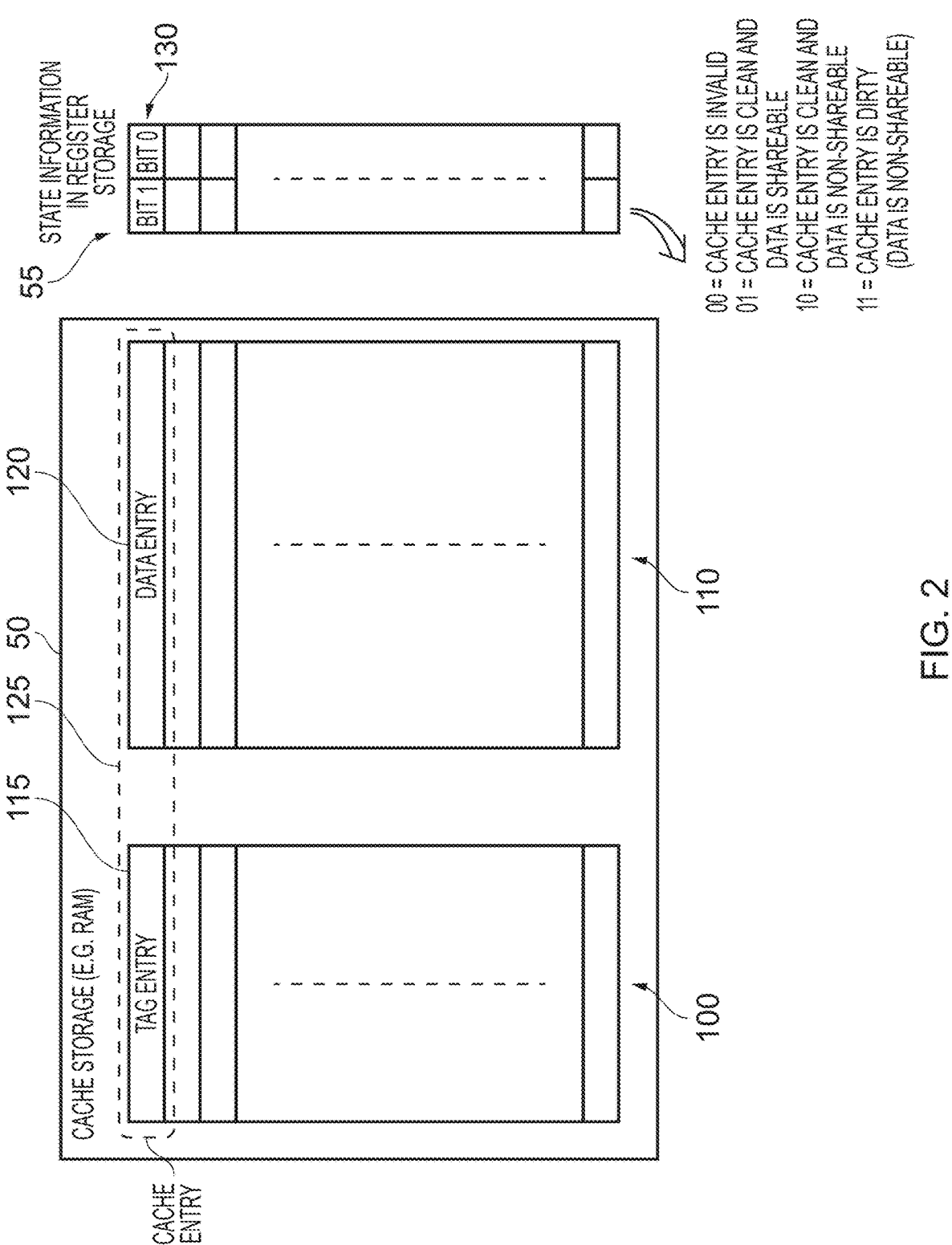
FIG. 2 schematically illustrates the cache storage and associated register storage of FIG. 1, in accordance with one example implementation.

FIG. 2 is a diagram illustrating in more detail the cache storage 50 and associated register storage 55 in one example implementation. The cache storage 50 provides a plurality of cache entries 125. In one example implementation, a TAG RAM portion 100 and a data RAM portion 110 are provided within the cache storage 50, the TAG RAM portion comprising a number of TAG entries 115 and the data RAM portion comprising a number of data entries 120. Each cache entry 125 comprises a data entry 120 for storing one or more items of data, and a corresponding TAG entry 115 for storing address indicating information used to identify the memory address associated with the data stored in the corresponding data entry 120 of the cache entry 125. Whilst certain state information might also typically be included within the tag entry 115, for example to identify whether the cache entry is valid, whether the data stored therein is clean or dirty, etc., in accordance with one example implementation that state information is stored separately within the register storage 55. In one particular implementation the register storage is organised in the way illustrated in FIG. 2, and provides a two-bit register entry 130 for each cache entry 125. The value of those two bits are used to indicate one of four possible states, as illustrated in FIG. 2. In particular, as shown the states can be used to distinguish between a cache entry that is invalid, a cache entry whose stored data is clean and shareable, a cache entry whose stored data is clean and non-shareable, and a cache entry whose stored data is dirty (in the particular example considered herein, it is only possible for non-shareable data to be dirty, since shareable data in the LLRAM is restricted to be write through data, and shareable data in the further portion of memory 40 is downgraded to non-cacheable). It will be appreciated that the actual state associated with any given two-bit value can be varied dependent on implementation, and the specific values shown in FIG. 2 are merely used for the purposes of illustration.

With such an arrangement, it will be appreciated that when seeking to invalidate each cache entry storing data associated with a memory address in the shareable memory region of the LLRAM 30 prior to entering the data retention mode, all that is needed is to identify every register entry whose stored 2-bit value indicates that state, and then to alter the stored two-bit value of such a register entry to a value indicating the invalid state (in the particular example illustrated in FIG. 2, this involving identifying every register entry with the value "01" and then changing the value of each such register entry to "00"). This can be performed very quickly, and in one example implementation the whole process can be performed within a single clock cycle, hence resulting in the ability to perform the necessary invalidations without significantly delaying transition into the data retention mode.

Figure 3:
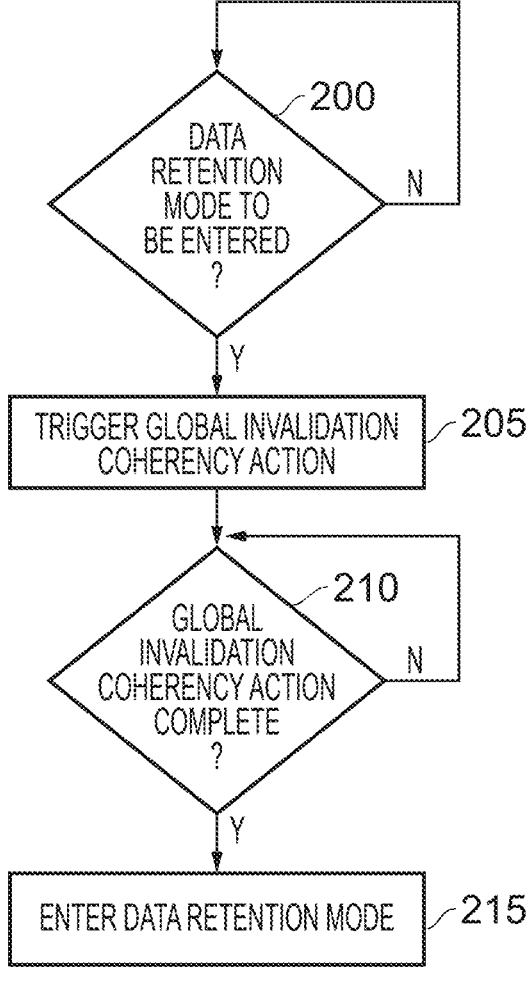
FIG. 3 is a flow diagram illustrating steps that may be performed when it is determined that the processing unit of FIG. 1 should enter a data retention mode, in accordance with one example implementation.

FIG. 3 is a flow diagram illustrating steps that may be taken when it is determined that the data retention mode is to be entered for the processing unit 10. When such a determination is made at step 200, then the power control circuitry 65 is arranged to trigger a global invalidation coherency action, for example by sending a suitable signal to the snoop circuitry 60 to cause it to perform the required invalidation action. Performance of the global invalidation coherency action will be discussed in more detail later with reference to FIG. 4.

At step 210, confirmation that the global invalidation coherency action has been performed is awaited, and when that confirmation is received the power control circuitry 65 is then arranged at step 215 to transition the processing unit 10 into the data retention mode. At this point, the information within the cache storage 50 and the associated register storage 55 will be retained, whilst the processing circuitry 45 and the snoop circuitry 60 will enter an inactive state, for example by removing the power to those circuit components.

Figure 4:
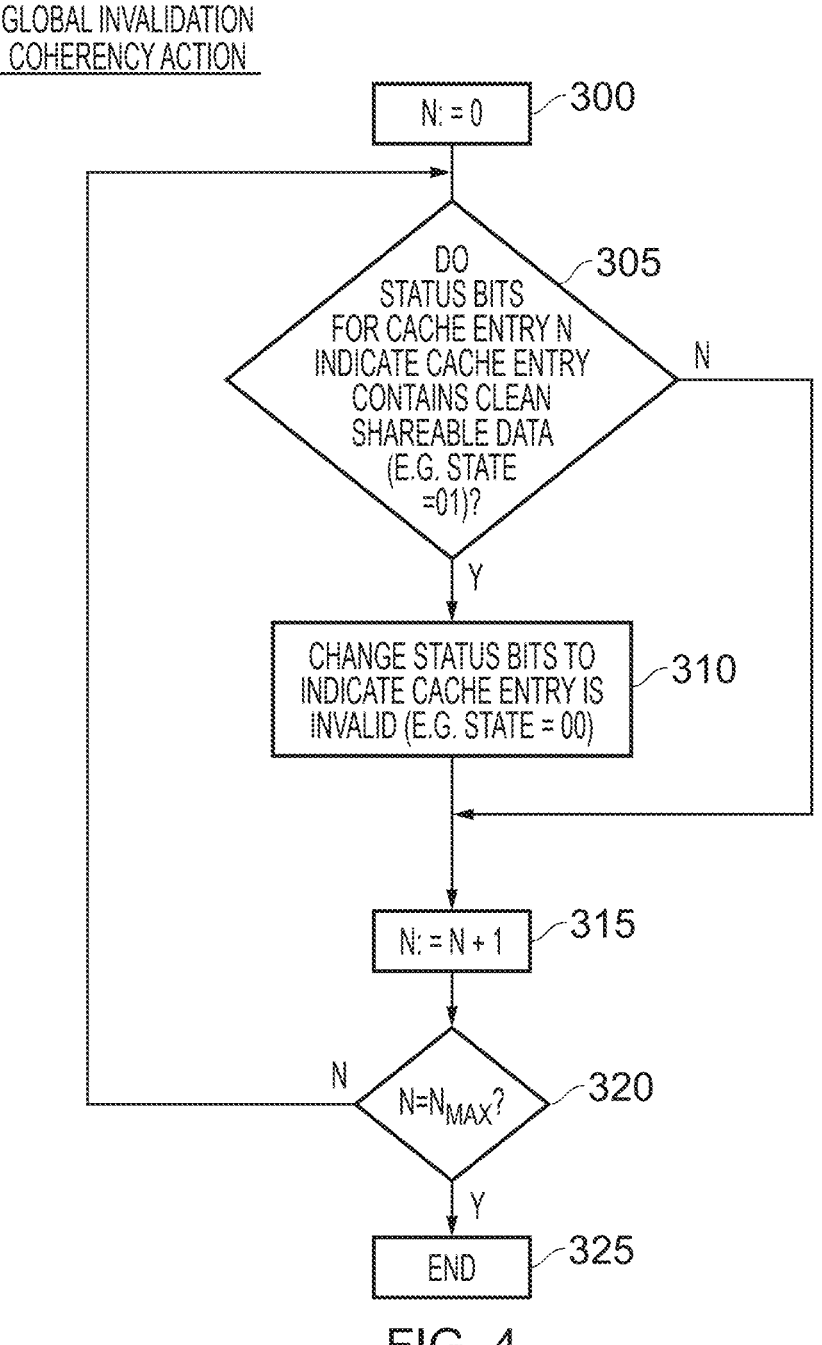
FIG. 4 is a flow diagram illustrating steps that may be performed to implement a global invalidation coherency action, in accordance with one example implementation.

FIG. 4 schematically illustrates performance of the global invalidation coherency action. Whilst for the purposes of ease of illustration this process is shown in the flow diagram of FIG. 4 as a sequential series of steps, it should be noted that in one example implementation the process can be performed in parallel for all of the register entries, and hence the process of FIG. 4 can be completed within a single clock cycle. At step 300, a parameter N is set equal to 0, whereafter at step 305 it is determined whether the status bits for cache entry 0 indicate that the cache entry contains clean shareable data. When using the example encoding shown in FIG. 2, this will hence be the case if the status bits have the value "01". If this is the case, then at step 310 the status bits are changed to indicate that the cache entry is invalid (considering the example encoding of FIG. 2 this will involve changing the status bits to have the value "00"). If the status bits for the cache entry N do not indicate that the cache entry contains clean shareable data, then step 310 is bypassed.

Following step 310, or following step 305 if step 310 is bypassed, the value of the parameter N is incremented by 1 at step 315, and it is then determined at step 320 whether all cache entries have now be considered (in the example of FIG. 4 this being the case when the parameter N is $N_{MAX}$). Assuming there are still further cache entries to consider, the process returns to step 305, but once all cache entries have been considered, the process ends at step 325.

Figure 5:
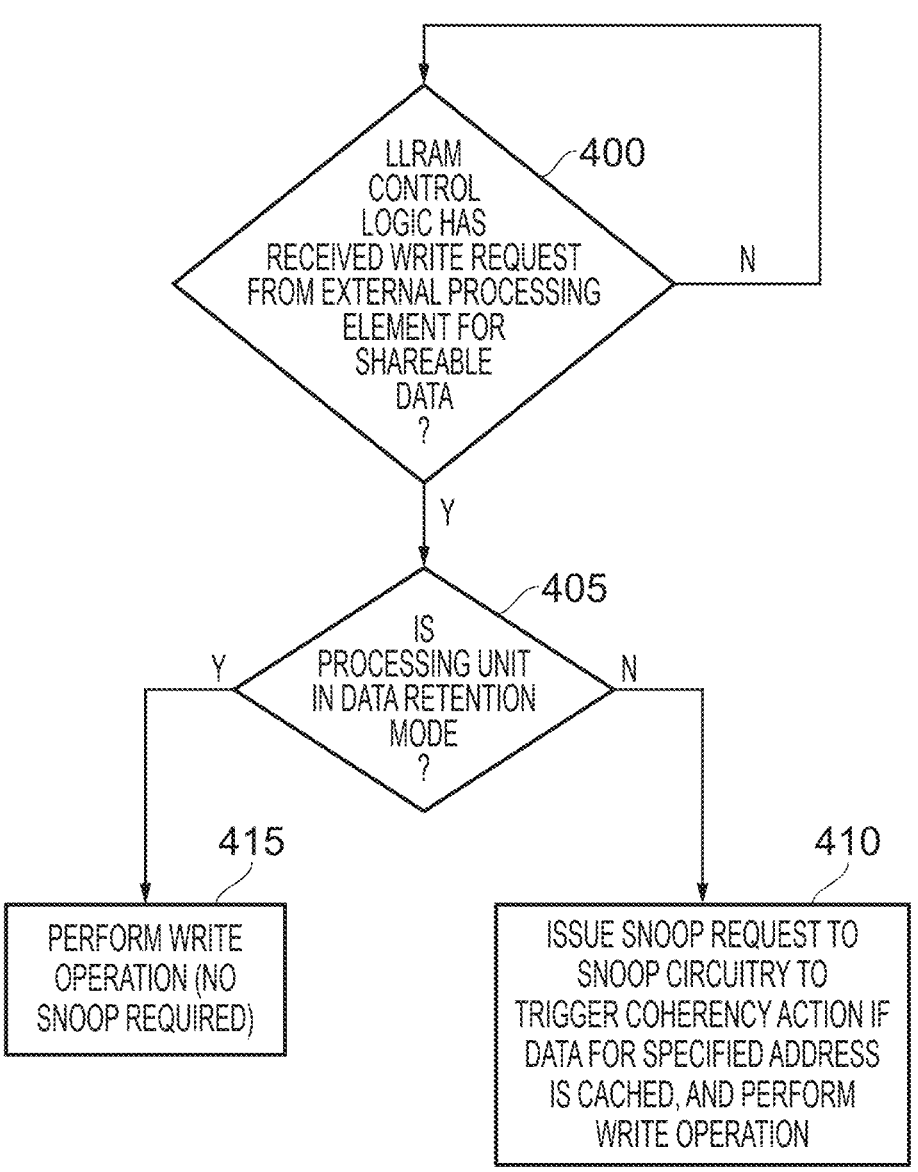
FIG. 5 is a flow diagram illustrating steps that may be performed by the memory control circuitry of the processing unit upon receiving a write request from an external processing element relating to an item of shareable data, in accordance with one example implementation.

FIG. 5 is a flow diagram illustrating steps performed when the LLRAM control logic 35 has received a write request from an external processing element in respect of shareable data for a memory address in the LLRAM. When at step 400 that is determined to be the case, it is then determined at step 405 whether the processing unit is operating in the data retention mode. If not, the process proceeds to step 410, where the LLRAM control logic 35 issues a snoop request of the snoop circuitry 60 to trigger a coherency action if data for the specified address is cached within the cache storage 50. As discussed earlier, in one particular example implementation that coherency action merely involves invalidating any cached copy of the data (by marking the relevant cache entry as invalid). In addition, the write operation is then performed within the LLRAM. In one example implementation, both the snoop operation and the write operation can be performed in parallel, since the LLRAM control logic 35 is the point of serialization, and hence can ensure that any reads and writes ordered after the above-mentioned write from the external processing element will observe the effects of both the snoop invalidation and the write.

However, if it is determined at step 405 that the processing unit is in the data retention mode, then the process proceeds to step 415 where the write operation is performed without any snoop operation being required, and hence without a snoop request being issued to the snoop circuitry 60. In particular, as will be apparent from the earlier discussion, any cached copy of shareable data in the LLRAM will have been invalidated before entering the data retention mode, and hence it is known that no snoop is required. This hence avoids the need for the processing unit to exit the data retention mode in order to perform a snoop.

Figure 6:
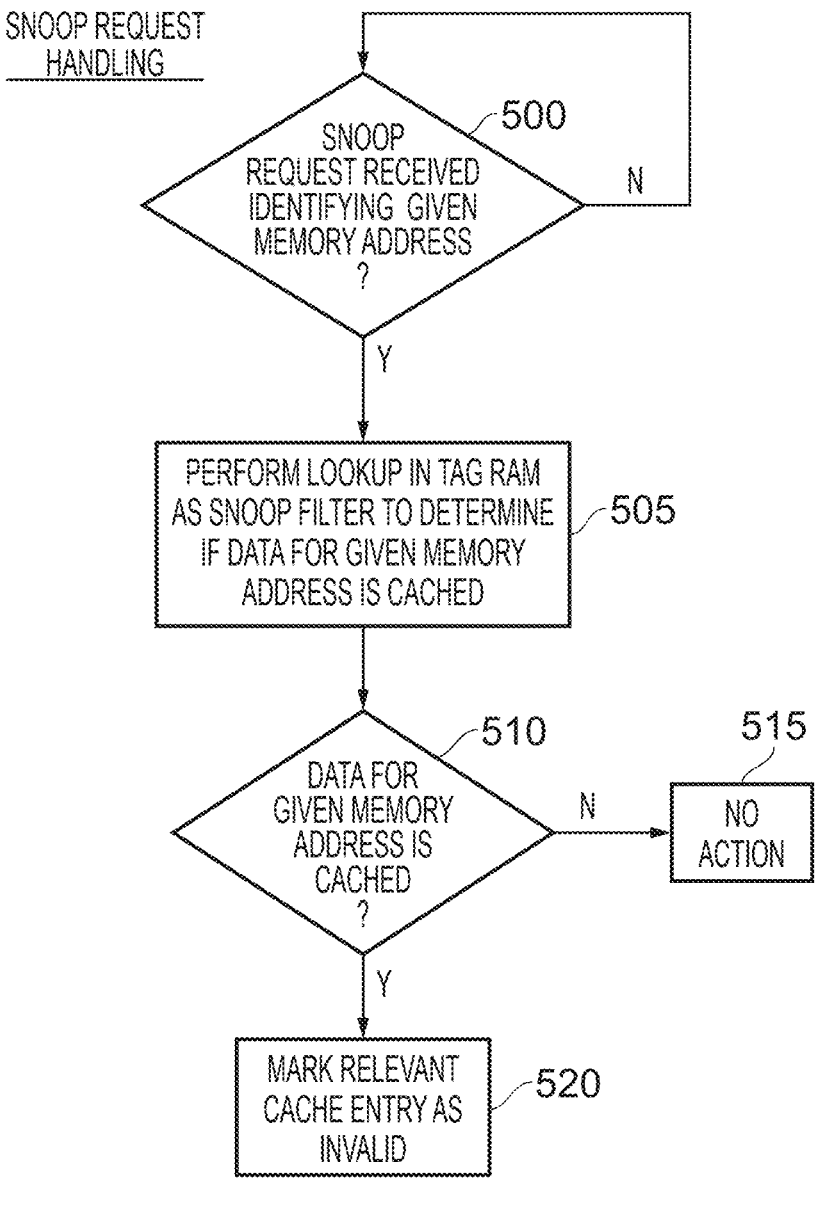
FIG. 6 is a flow diagram schematically illustrating how a snoop request may be handled, in accordance with one example implementation.

FIG. 6 is a flow diagram illustrating steps performed by the snoop circuitry 60 when processing a snoop request. At step 500, it is determined whether a snoop request has been received. Such a snoop request will identify a memory address, and that identified memory address will be referred to as the given memory address in the following discussion. When such a snoop request is received, then at step 505 a lookup is performed within the TAG RAM of the cache storage in order to determine if data for the given memory address is cached. Hence, it can be seen that the TAG RAM used during normal cache lookup operations also serves the purpose of a snoop filter when processing snoop requests, since a lookup within the TAG RAM is sufficient to determine whether a copy of data for the given memory address is present in the cache storage 50, and hence whether a coherency action is required to invalidate that data.

If at step 510 it is determined that the data for the given memory address is not cached, then as indicated in FIG. 6 no action is taken at step 515. However, if it is determined that data for the given memory address is cached, then at step 520 the relevant cache entry is marked as invalid. In the described implementation no further action is required, and in particular there is no need to support other forms of coherency action. In particular, such a snoop request will only be issued in respect of accesses made to shareable data in the LLRAM and in the example implementation described all such shareable data is treated as write through data. As a result, any copy of that data stored in the cache cannot be dirty, and it is sufficient merely to invalidate the entry containing that cached copy.

In the particular example implementation discussed earlier, any shareable data associated with a memory address in the further portion of memory 40 will be treated as non-cacheable, and hence cannot be stored within the cache storage 50. Further, whilst non-shareable data, whether from the LLRAM 30 or from the further portion of memory 40, can be cached within the cache storage 50, and can be treated as write through data or write back data, since that data is non-shareable no external processing element should be seeking to modify that data, and accordingly no hardware coherency mechanism is provided in the example implementation considered. Thus, no snoop request will be issued in respect of such non-shareable data.

Figure 7:
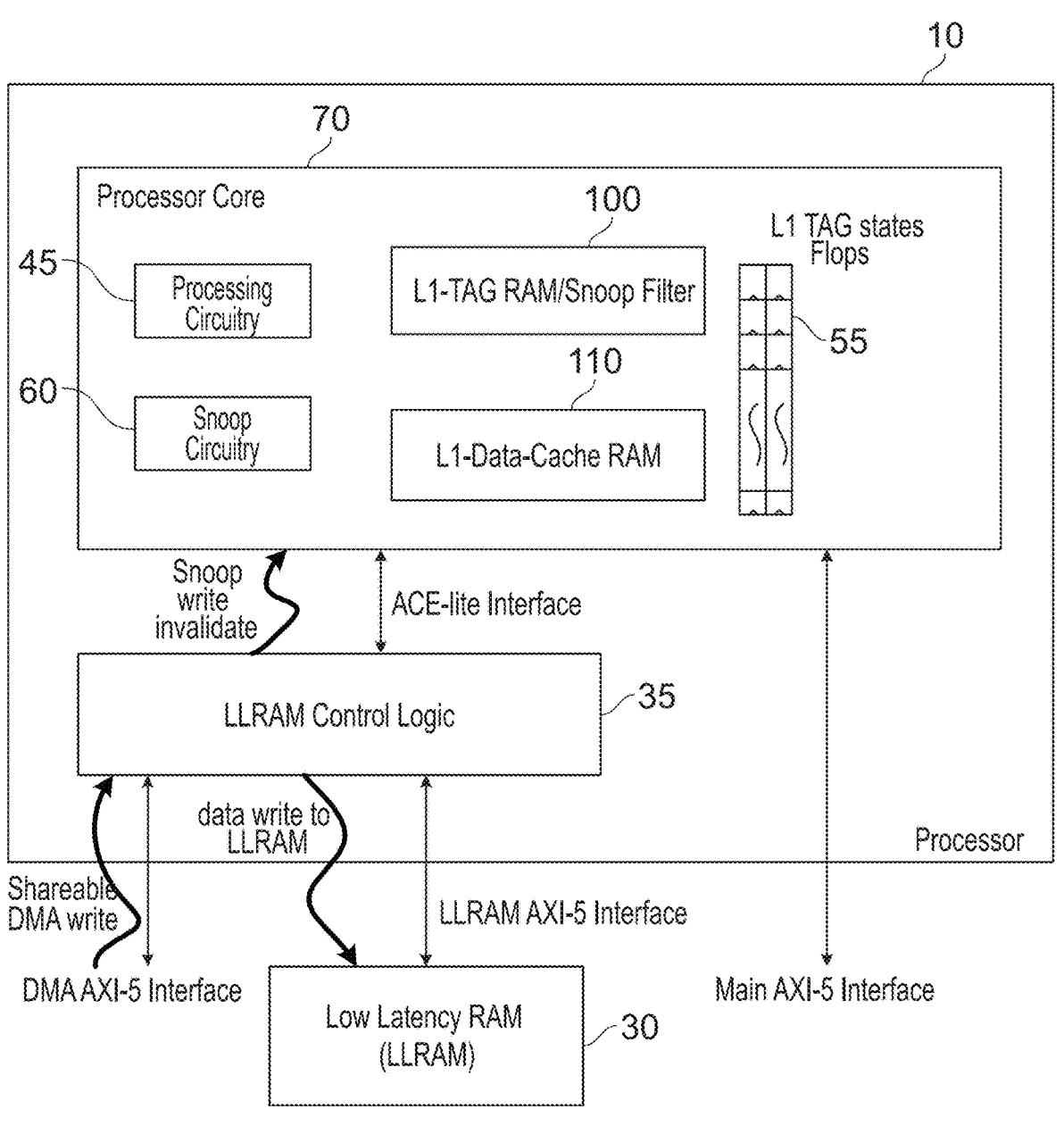
FIG. 7 schematically illustrates the handling of a write request issued by a direct memory access (DMA) unit relating to an item of shareable data, when the processing unit is operating in a normal mode of operation, in accordance with one example implementation.

FIG. 7 illustrates a particular example implementation of the processing unit 10 shown in FIG. 1. For ease of reference, the same reference numerals are used in FIG. 7 to denote elements corresponding to elements discussed earlier with reference to FIGS. 1 and 2. FIG. 7 illustrates how a write request issued by the DMA engine 15 specifying a memory address corresponding to shareable data in the LLRAM 30 is processed, when the processing unit 10 is in the normal mode of operation. As shown in FIG. 7, the processing unit 10 includes a processor core 70, which in this example includes the earlier-mentioned processing circuitry 45 and snoop circuitry 60, the data cache formed of the TAG RAM 100 and data RAM 110, and the associated register storage 55 implemented by a series of flops. When such a write request is issued by the DMA, the LLRAM control logic 35 will identify that the request relates to shareable data, and hence in addition to accessing the LLRAM 30 to perform the required write operation, the LLRAM control logic 35 will issue a snoop write invalidate request to the processor core 70, which causes the snoop circuitry 60 to perform the earlier described snoop operation in order to invalidate any cached copy of the data associated with the specified memory address in order to maintain coherency.

Figure 8:
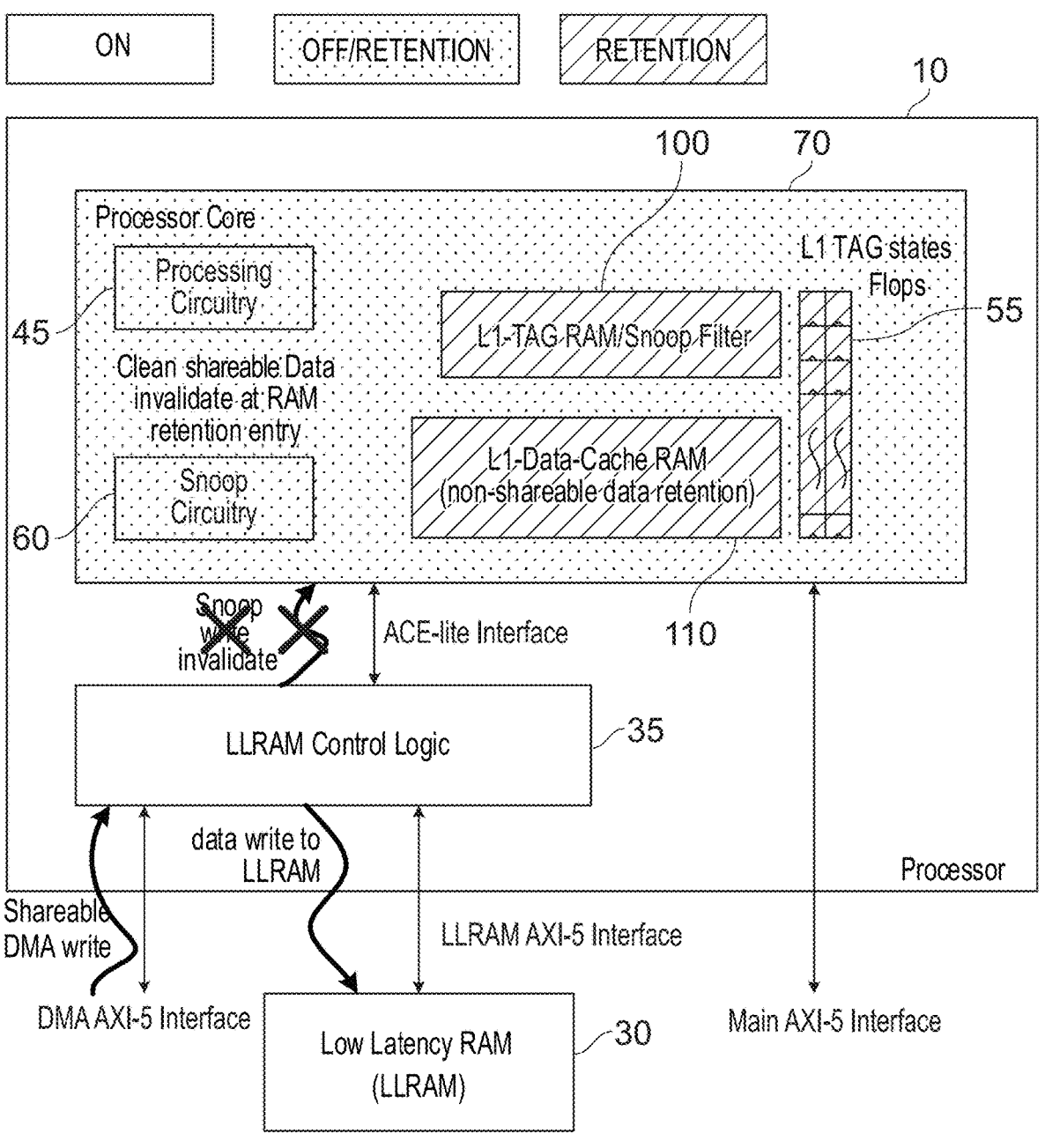
FIG. 8 schematically illustrates the handling of a write request issued by the DMA unit relating to an item of shareable data, when the processing unit is operating in a data retention mode of operation, in accordance with one example implementation.

FIG. 8 illustrates the handling of the same write request from the DMA engine, in a situation where the processing unit is in the data retention mode. As shown by the various different shadings in FIG. 8, the TAG RAM 100, data RAM 110 and associated register storage 55 are in a state where their contents are retained, whilst the processing circuitry 45 and snoop circuitry 60 are in an inactive state. However the LLRAM control logic 35 is in an always on power domain in this example, and hence is able to continue to process a write request from the DMA engine. However, due to the earlier described steps taken prior to entering the data retention mode, it is known that there will be no valid cached copy of data for the memory address specified by the write request, and accordingly the LLRAM control logic 35 can merely access the LLRAM 30 to perform the write operation, without needing to issue any associated snoop write invalidate request to the processor core 70.

As a result of the above described techniques, it will be appreciated that the techniques described herein can avoid the need to wake up a processor core to handle snoop requests whilst the processing unit providing that processor core is in a data retention mode, whilst allowing updates to shareable data in a memory device associated with the processing unit to continue to be performed. Only copies of shareable data associated with memory addresses in that memory device are invalidated prior to entering the data retention mode, and all other contents of the cache are retained. It should also be noted that any other cache structures are not affected—for example, an instruction cache, where provided, will retain its contents during the data retention mode. Hence, it can be seen that the techniques described herein avoid any significant performance impact to the processor when normal operation is resumed.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
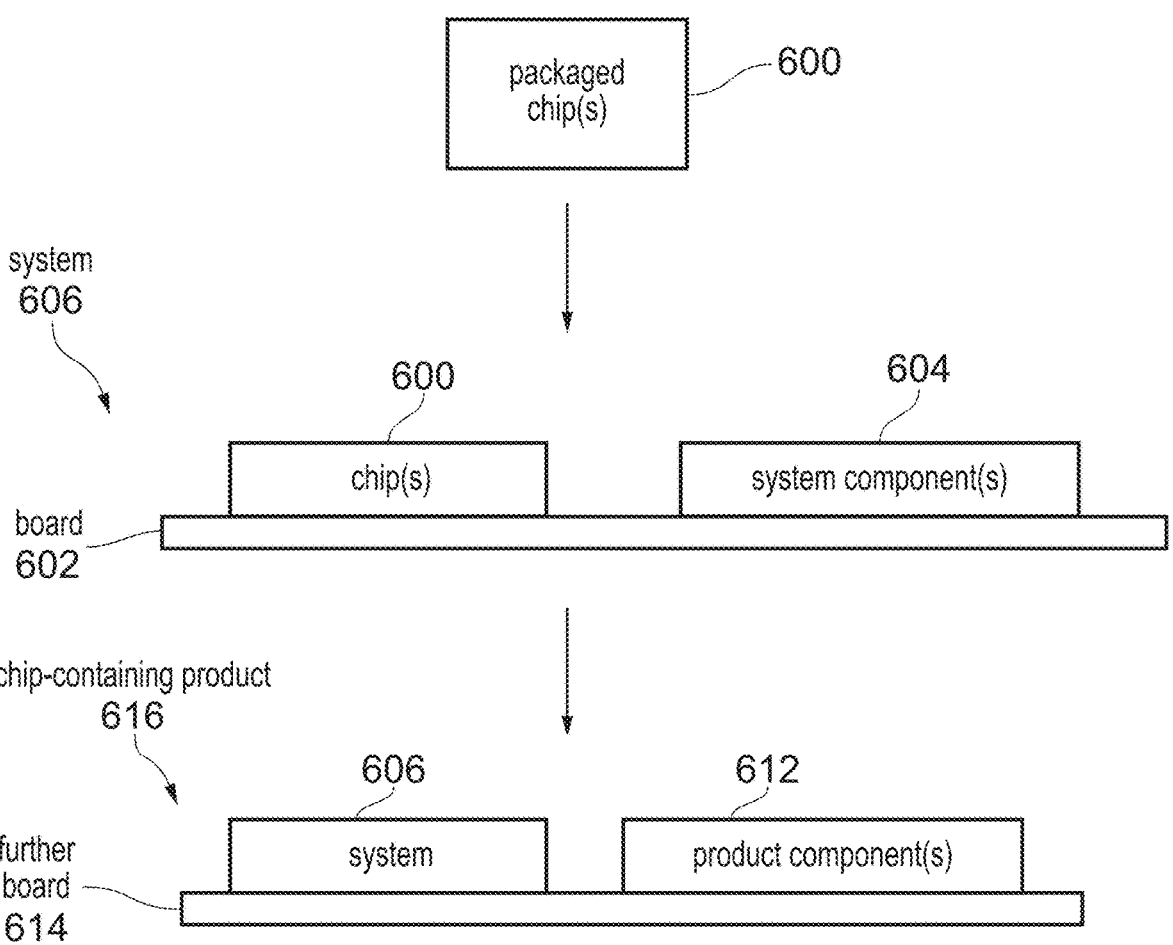
FIG. 9 illustrates a system and a chip-containing product.

As shown in FIG. 9, one or more packaged chips 600, with the apparatus described above implemented on one chip or distributed over two or more of the chips, are manufactured by a semiconductor chip manufacturer. In some examples, the chip product 600 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 600 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips combined to provide the functionality of a single chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 600 are assembled on a board 602 together with at least one system component 604 to provide a system 606. For example, the board may comprise a printed circuit board. The board substrate may be made of any of a variety of materials, e.g. plastic, glass, ceramic, or a flexible substrate material such as paper, plastic or textile material. The at least one system component 604 comprise one or more external components which are not part of the one or more packaged chip(s) 600. For example, the at least one system component 604 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 616 is manufactured comprising the system 606 (including the board 602, the one or more chips 600 and the at least one system component 604) and one or more product components 612. The product components 612 comprise one or more further components which are not part of the system 606. As a non-exhaustive list of examples, the one or more product components 612 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 606 and one or more product components 612 may be assembled on to a further board 614.

The board 602 or the further board 614 may be provided on or within a device housing or other structural support (e.g. a frame or blade) to provide a product which can be handled by a user and/or is intended for operational use by a person or company.

The system 606 or the chip-containing product 616 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/ or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention.

Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some example configurations are set out in the following numbered clauses:

1. A processing unit comprising:
   processing circuitry configured to perform data processing operations on data accessible in memory;
   cache storage having a plurality of cache entries configured to store a subset of the data accessible in the memory, for access by the processing circuitry;
   memory control circuitry configured to control access to a given portion of the memory associated with the processing unit, the given portion of memory comprising at least a shareable memory region to store data that is also accessible by at least one external processing element external to the processing unit;
   snoop circuitry, responsive to a snoop request identifying a memory address, to perform a coherency action in respect of data stored in the cache storage for the identified memory address; and
   power control circuitry configured to enable the processing unit to be transitioned between a plurality of operating modes, including a data retention mode where the data in the cache storage is retained whilst the processing circuitry and the snoop circuitry are configured to be inactive;
   wherein:
   the power control circuitry is configured, when transitioning the processing unit into the data retention mode, to cause a given invalidation coherency action to be performed in order to invalidate each cache entry storing data associated with a memory address in the shareable memory region; and
   the memory control circuitry is configured, whilst the processing unit is in the data retention mode, to allow a write operation instigated by the at least one external processing element, that specifies a given memory address within the shareable memory region, to be performed without waking up the snoop circuitry to process a corresponding snoop request for the given memory address.

2. A processing unit as in Clause 1, wherein:
   the plurality of operating modes further comprises a normal mode where the processing circuitry and the snoop circuitry are configured to be active; and
   the memory control circuitry is configured, whilst the processing unit is in the normal mode, to be responsive to the write operation instigated by the at least one external processing element to allow the write operation to be performed but in addition to cause the corresponding snoop request to be issued to the snoop circuitry to cause the coherency action to be performed in the event that data for the given memory address is stored within the cache storage.

3. A processing unit as in Clause 1 or Clause 2, wherein the given portion of memory further comprises a non-shareable memory region to store data inaccessible to the at least one external processing element.

4. A processing unit as in any preceding clause, wherein the cache storage is configured to treat any cacheable data associated with a memory address in the shareable memory region as write through, and the given invalidation coherency action comprises marking as invalid each cache entry storing data associated with a memory address in the shareable memory region.

5. A processing unit as in any preceding clause, further comprising:

register storage associated with the cache storage, the register storage providing a plurality of register entries, wherein each register entry is arranged to store state information for an associated cache entry of the cache storage, and the state information is sufficient to enable identification of the cache entries that have stored therein data associated with a memory address in the shareable memory region; and the power control circuitry is arranged to cause the given invalidation coherency action to be performed by referencing the state information in the register storage without requiring a lookup in the cache storage to be performed.

6. A processing unit as in Clause 5, wherein performance of the given invalidation coherency action comprises identifying each register entry whose state information indicates that the associated cache entry has stored therein data associated with a memory address in the shareable memory region, and for each identified register entry updating the state information to indicate that the associated cache entry is in an invalid state.

7. A processing unit as in any preceding clause, wherein the memory comprises a further portion that is accessible to the processing unit via interconnect circuitry, the further portion comprising a further shareable memory region to store data that is also accessible by the at least one external processing element, and a further non-shareable memory region to store data inaccessible to the at least one external processing element.

8. A processing unit as in Clause 7, when dependent on clause 5, wherein each register entry is arranged to identify, for the associated cache entry, one of the following states:

a first state indicating that the associated cache entry is invalid;

a second state indicating that the associated cache entry stores data that is clean and in a shareable memory region of the memory;

a third state indicating that the associated cache entry stores data that is clean and in a non-shareable memory region of the memory;

a fourth state indicating that the associated cache entry stores data that is dirty and in the non-shareable memory region of the memory.

9. A processing unit as in Clause 7 or Clause 8, wherein the processing unit is arranged to treat any data stored in the further shareable memory region as non-cacheable so that the cache storage is arranged, when caching data from the further portion of the memory, to only cache data from the further non-shareable memory region.

10. A processing unit as in Clause 9 when dependent on Clause 8, wherein the second state indicates that the associated cache entry stores data that is clean and in the shareable memory region of the given portion of the memory, since the cache storage is not configured to cache data from the further shareable memory region.

11. A processing unit as in any preceding clause, wherein:

each cache entry comprises a data entry for storing data and a TAG entry for storing address indicating information used to identify the memory address associated with that data; and the snoop circuitry is arranged when processing a snoop request identifying a given memory address, to reference at least a subset of the TAG entries to determine whether one of the cache entries stores data for the given memory address, and in that event to perform the coherency action.

12. A processing unit as in Clause 11, wherein the coherency action comprises invalidating said one of the cache entries when the data for the given memory address is being treated as write through.

13. A processing unit as in any preceding clause, wherein for a given item of cacheable data in a non-shareable memory region of the memory, the cache storage is configured to identify whether that given item of cacheable data, when stored in the cache storage, is to be treated as write through data or write back data.

14. A processing unit as in any preceding clause, wherein the at least one external processing element comprises at least an accelerator device configured to perform tasks on behalf of the processing unit.

15. A processing unit as in any preceding clause, wherein:

the memory comprises a further portion that is accessible to the processing unit via interconnect circuitry; and the given portion is configured to provide the processing unit with lower latency access to data than when accessing data in the further portion.

16. A method of operating a processing unit, comprising:

performing, using processing circuitry, data processing operations on data accessible in memory;

storing, within a cache storage having a plurality of cache entries, a subset of the data accessible in the memory, for access by the processing circuitry;

controlling, using memory control circuitry, access to a given portion of the memory associated with the processing unit, the given portion of memory comprising at least a shareable memory region to store data that is also accessible by at least one external processing element external to the processing unit;

responsive to a snoop request identifying a memory address, performing using snoop circuitry a coherency action in respect of data stored in the cache storage for the identified memory address;

transitioning the processing unit between a plurality of operating modes, including a data retention mode where the data in the cache storage is retained whilst the processing circuitry and the snoop circuitry are configured to be inactive;

when transitioning the processing unit into the data retention mode, causing a given invalidation coherency action to be performed in order to invalidate each cache entry storing data associated with a memory address in the shareable memory region; and whilst the processing unit is in the data retention mode, allowing a write operation instigated by the at least one external processing element, that specifies a given memory address within the shareable memory region, to be performed without waking up the snoop circuitry to process a corresponding snoop request for the given memory address.

17. A system comprising:

the processing unit of any of clauses 1 to 15, implemented in at least one packaged chip;

at least one system component; and a board, wherein the at least one packaged chip and the at least one system component are assembled on the board.

18. A chip-containing product comprising the system of clause 17, wherein the system is assembled on a further board with at least one other product component.

19. A computer-readable medium storing computer-readable code for fabrication of the processing unit of any of clauses 1 to 15.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A processing unit comprising:

processing circuitry configured to perform data processing operations on data accessible in memory;

cache storage having a plurality of cache entries configured to store a subset of the data accessible in the memory, for access by the processing circuitry;

memory control circuitry configured to control access to a given portion of the memory associated with the processing unit, the given portion of memory comprising at least a shareable memory region to store data that is also accessible by at least one external processing element external to the processing unit;

snoop circuitry, responsive to a snoop request identifying a memory address, to perform a coherency action in respect of data stored in the cache storage for the identified memory address; and power control circuitry configured to enable the processing unit to be transitioned between a plurality of operating modes, including a data retention mode where the data in the cache storage is retained whilst the processing circuitry and the snoop circuitry are configured to be inactive;

wherein:

the power control circuitry is configured, when transitioning the processing unit into the data retention mode, to cause a given invalidation coherency action to be performed in order to invalidate each cache entry storing data associated with a memory address in the shareable memory region; and the memory control circuitry is configured, whilst the processing unit is in the data retention mode, to allow a write operation instigated by the at least one external processing element, that specifies a given memory address within the shareable memory region, to be performed without waking up the snoop circuitry to process a corresponding snoop request for the given memory address.

2. A processing unit as claimed in claim 1, wherein:

the plurality of operating modes further comprises a normal mode where the processing circuitry and the snoop circuitry are configured to be active; and the memory control circuitry is configured, whilst the processing unit is in the normal mode, to be responsive to the write operation instigated by the at least one external processing element to allow the write operation to be performed but in addition to cause the corresponding snoop request to be issued to the snoop circuitry to cause the coherency action to be performed in the event that data for the given memory address is stored within the cache storage.

3. A processing unit as claimed in claim 1, wherein the given portion of memory further comprises a non-shareable memory region to store data inaccessible to the at least one external processing element.

4. A processing unit as claimed in claim 1, wherein the cache storage is configured to treat any cacheable data associated with a memory address in the shareable memory region as write through, and the given invalidation coherency action comprises marking as invalid each cache entry storing data associated with a memory address in the shareable memory region.

5. A processing unit as claimed in claim 1, further comprising:

register storage associated with the cache storage, the register storage providing a plurality of register entries, wherein each register entry is arranged to store state information for an associated cache entry of the cache storage, and the state information is sufficient to enable identification of the cache entries that have stored therein data associated with a memory address in the shareable memory region; and the power control circuitry is arranged to cause the given invalidation coherency action to be performed by referencing the state information in the register storage without requiring a lookup in the cache storage to be performed.

6. A processing unit as claimed in claim 5, wherein performance of the given invalidation coherency action comprises identifying each register entry whose state information indicates that the associated cache entry has stored therein data associated with a memory address in the shareable memory region, and for each identified register entry updating the state information to indicate that the associated cache entry is in an invalid state.

7. A processing unit as claimed in claim 1, wherein the memory comprises a further portion that is accessible to the processing unit via interconnect circuitry, the further portion comprising a further shareable memory region to store data that is also accessible by the at least one external processing element, and a further non-shareable memory region to store data inaccessible to the at least one external processing element.

8. A processing unit as claimed in claim 5, wherein:

each register entry is arranged to identify, for the associated cache entry, one of the following states:

a first state indicating that the associated cache entry is invalid;

a second state indicating that the associated cache entry stores data that is clean and in a shareable memory region of the memory;

a third state indicating that the associated cache entry stores data that is clean and in a non-shareable memory region of the memory;

a fourth state indicating that the associated cache entry stores data that is dirty and in the non-shareable memory region of the memory.

9. A processing unit as claimed in claim 7, wherein the processing unit is arranged to treat any data stored in the further shareable memory region as non-cacheable so that the cache storage is arranged, when caching data from the further portion of the memory, to only cache data from the further non-shareable memory region.

10. A processing unit as claimed in claim 8, wherein:

the memory comprises a further portion that is accessible to the processing unit via interconnect circuitry, the further portion comprising a further shareable memory region to store data that is also accessible by the at least one external processing element, and a further non-shareable memory region to store data inaccessible to the at least one external processing element;

the processing unit is arranged to treat any data stored in the further shareable memory region as non-cacheable so that the cache storage is arranged, when caching data from the further portion of the memory, to only cache data from the further non-shareable memory region; and the second state indicates that the associated cache entry stores data that is clean and in the shareable memory region of the given portion of the memory, since the cache storage is not configured to cache data from the further shareable memory region.

11. A processing unit as claimed in claim 1, wherein:

each cache entry comprises a data entry for storing data and a TAG entry for storing address indicating information used to identify the memory address associated with that data; and the snoop circuitry is arranged when processing a snoop request identifying a given memory address, to reference at least a subset of the TAG entries to determine whether one of the cache entries stores data for the given memory address, and in that event to perform the coherency action.

12. A processing unit as claimed in claim 11, wherein the coherency action comprises invalidating said one of the cache entries when the data for the given memory address is being treated as write through.

13. A processing unit as claimed in claim 1, wherein for a given item of cacheable data in a non-shareable memory region of the memory, the cache storage is configured to identify whether that given item of cacheable data, when stored in the cache storage, is to be treated as write through data or write back data.

14. A processing unit as claimed in claim 1, wherein the at least one external processing element comprises at least an accelerator device configured to perform tasks on behalf of the processing unit.

15. A processing unit as claimed in claim 1, wherein:

the memory comprises a further portion that is accessible to the processing unit via interconnect circuitry; and the given portion is configured to provide the processing unit with lower latency access to data than when accessing data in the further portion.

16. A method of operating a processing unit, comprising:

performing, using processing circuitry, data processing operations on data accessible in memory;

storing, within a cache storage having a plurality of cache entries, a subset of the data accessible in the memory, for access by the processing circuitry;

controlling, using memory control circuitry, access to a given portion of the memory associated with the processing unit, the given portion of memory comprising at least a shareable memory region to store data that is also accessible by at least one external processing element external to the processing unit;

responsive to a snoop request identifying a memory address, performing using snoop circuitry a coherency action in respect of data stored in the cache storage for the identified memory address;

transitioning the processing unit between a plurality of operating modes, including a data retention mode where the data in the cache storage is retained whilst the processing circuitry and the snoop circuitry are configured to be inactive;

when transitioning the processing unit into the data retention mode, causing a given invalidation coherency action to be performed in order to invalidate each cache entry storing data associated with a memory address in the shareable memory region; and whilst the processing unit is in the data retention mode, allowing a write operation instigated by the at least one external processing element, that specifies a given memory address within the shareable memory region, to be performed without waking up the snoop circuitry to process a corresponding snoop request for the given memory address.

17. A system comprising:

the processing unit of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A non-transitory, computer-readable storage medium storing computer-readable code for fabrication of the processing unit of claim 1.

\*  \*  \*  \*  \*